J. W. COWELL.
NUT LOCK.
APPLICATION FILED NOV. 8, 1910.
1,009,479.
Patented Nov. 21, 1911.
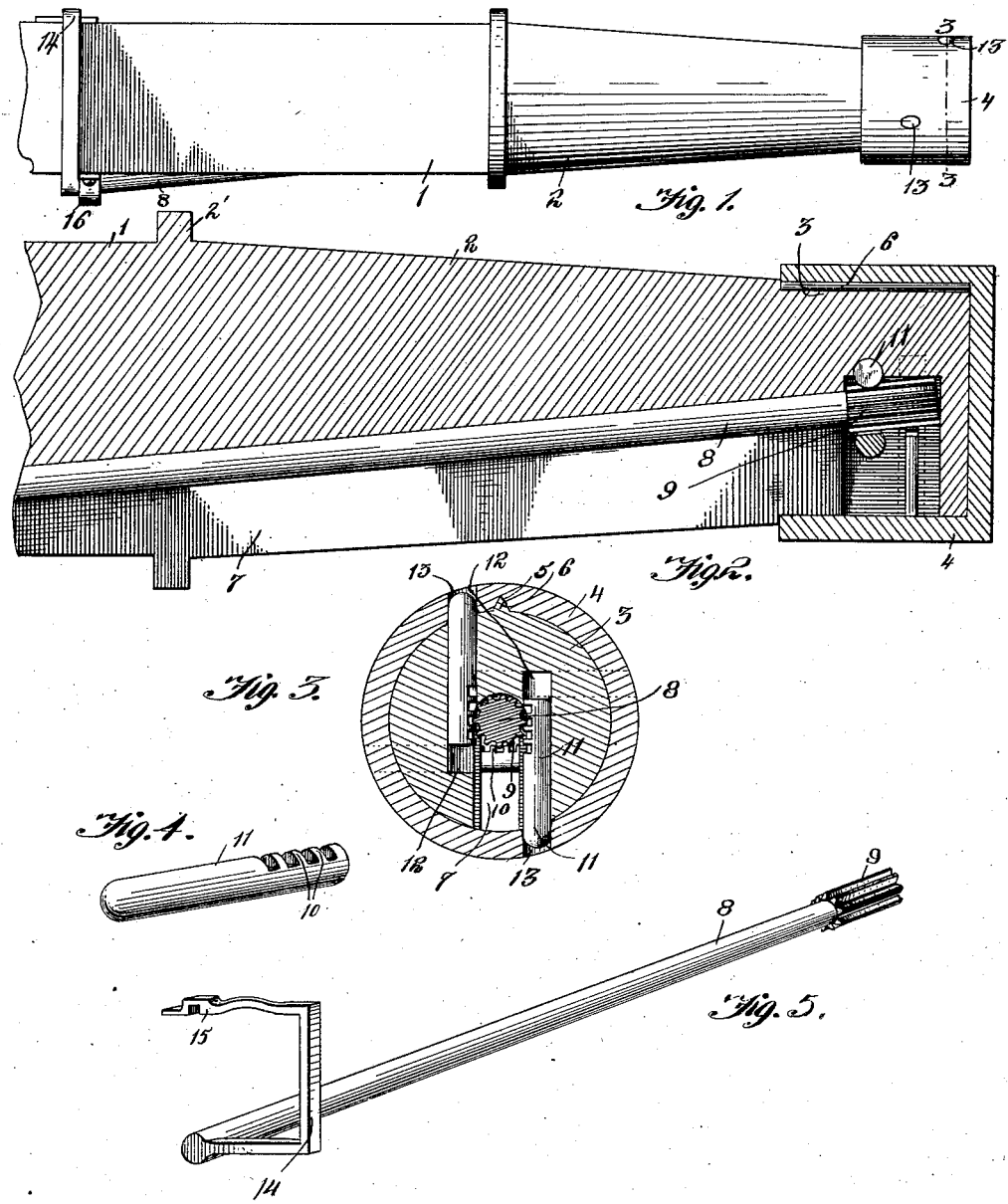
Inventor
John W. Cowell
Witnesses
By Victor J. Evans
Attorney

UNITED STATES PATENT OFFICE.

JOHN W. COWELL, OF SAN FRANCISCO, CALIFORNIA.

NUT-LOCK.

1,009,479.  Specification of Letters Patent.  Patented Nov. 21, 1911.

Application filed November 8, 1910. Serial No. 591,349.

*To all whom it may concern:*

Be it known that I, JOHN W. COWELL, a citizen of the United States, residing at 1282 Post street, in the city and county of San Francisco and State of California, have invented new and useful Improvements in Nut-Locks, of which the following is a specification.

This invention relates to nut locks and more particularly to devices for locking cap nuts upon vehicle axles.

The object of the invention is the provision of means whereby a cap nut may be readily secured upon the end of an axle to hold the hub in place without the use of threads and whereby the cap may be readily removed without the use of wrenches or like devices.

Further objects of the invention will appear as the following specific description is read in connection with the accompanying drawing which forms a part of this application, and in which:

Figure 1 is a side elevation. Fig. 2 is a longitudinal sectional view. Fig. 3 is a transverse section on the line 3—3 of Fig. 1. Fig. 4 is a perspective view of one of the locking pins removed. Fig. 5 is a similar view of the operating shaft.

Referring more particularly to the drawing 1 represents the axle which is provided as usual with the wheel stub 2 stop collar 2' and a reduced portion 3 upon which is usually formed the threads for the securing nut. In this instance the reduced extension is smooth and is adapted to receive a cap nut 4 which has a smooth interior and a groove 5 formed therein to engage a rib or projection 6 formed on the reduced extension whereby the nut is properly guided into place.

A portion of the axle and the full length of the stub and extension is provided with a channel 7 in which is journaled the operating shaft 8 having upon its outer end a series of elongated teeth or corrugations 9 adapted to mesh with the rack teeth 10 formed upon the locking pins 11. These locking pins are arranged in holes 12 formed in the extension 3 at different intervals around its circumference so as to be projected by the operating rod at four different points. The cap nut 4 is provided with apertures 13 which are adapted to register with the apertures 12 in the extension so that when the pins are projected by turning the shaft 8 they will enter the holes 13 and lock the cap from movement. The groove 5 and rib 6 guide the nut so that the apertures 12 and 13 are adapted to register. The inner end of the shaft is provided with a laterally offset arm 14 which is provided with a hooked end 15 adapted to spring over the axle or to be fastened thereto in any suitable manner and the shafts held in position in the channel by means of a bearing 16 which is secured to the underneath side of the axle.

Having thus described the invention, what is claimed is—

1. A device of the class described, a channeled axle, a nut mounted on one end thereof and having apertures therein, a shaft mounted in the channel, said shaft extending to a point beyond the stop collar of the axle and means projected by the shaft adapted to engage apertures in the nut to secure a hub in position upon the axle.

2. A device of the class described comprising a channeled axle, a shaft mounted in said axle, a plurality of pins adapted to be projected from opposite sides of the axle, a cap nut mounted upon the axle, and formed with apertures to receive said pins, and means to guide the cap nut in position in the axle said means serving to hold the cap against rotation, whereby the pins may be projected into said apertures.

3. A device of the class described, comprising a channeled axle, a shaft mounted therein and having a geared end, a plurality of pins mounted in the axle, transverse to the shaft and having rack teeth on one end thereof adapted to engage the gear on the shaft, a cap nut adapted to be mounted upon the shaft and having apertures to receive said pins, and means to guide the cap nut in position whereby the receiving means will register with the pins.

4. A device of the class described, comprising an axle having a channel, a shaft disposed within the channel, said shaft carrying a laterally off-set arm having a hooked end, arm and end being adapted to grip the axle at a point beyond the stop collar.

5. In a device of the class described, a channeled axle, a nut, a shaft disposed within said channel, said shaft carrying on one end means for projecting locking pins to engage apertures in the nut, and means on the opposite end to lock the shaft against rotation.

In testimony whereof I affix my signature in presence of two witnesses.

JOHN W. COWELL.

Witnesses:
J. A. McDONOUGH,
NETTIE BEELER.

Copies of this patent may be obtained for five cents each, by addressing the "Commissioner of Patents, Washington, D. C."